Nov. 8, 1955    M. ANDERSON    2,722,852
SAW SHARPENING MACHINE
Filed Aug. 3, 1951    3 Sheets-Sheet 1
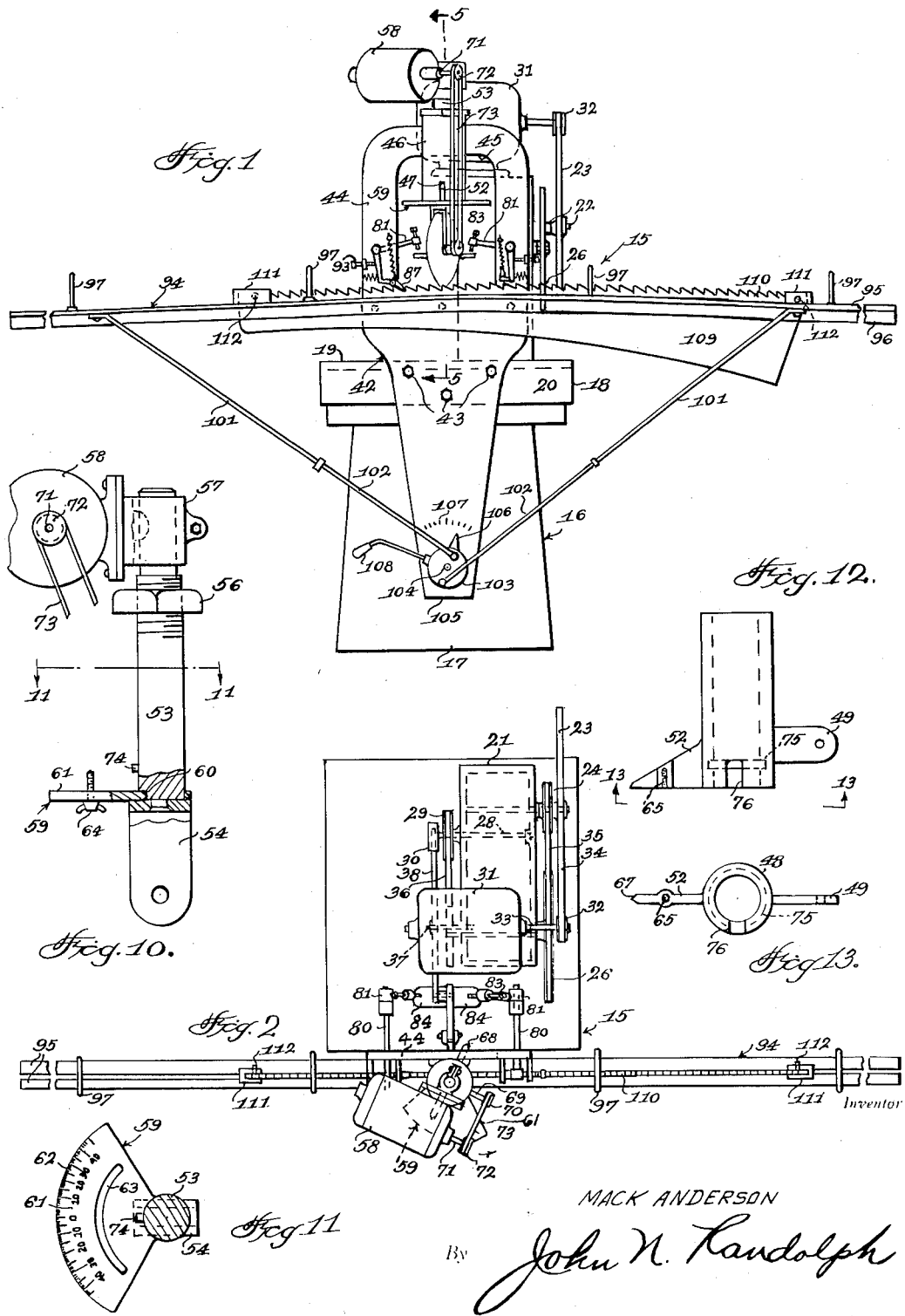
Inventor
MACK ANDERSON
By John N. Randolph
Attorney

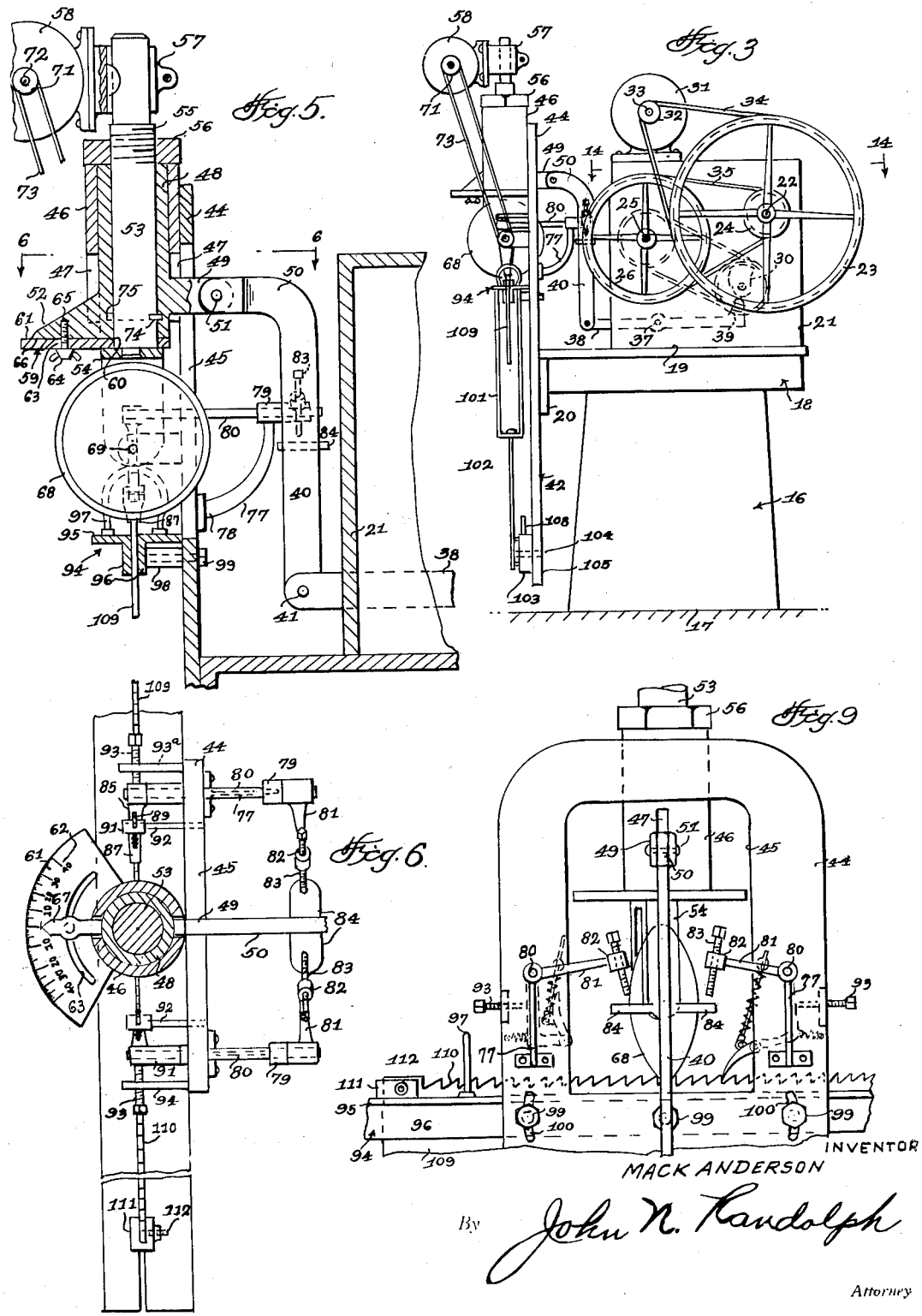

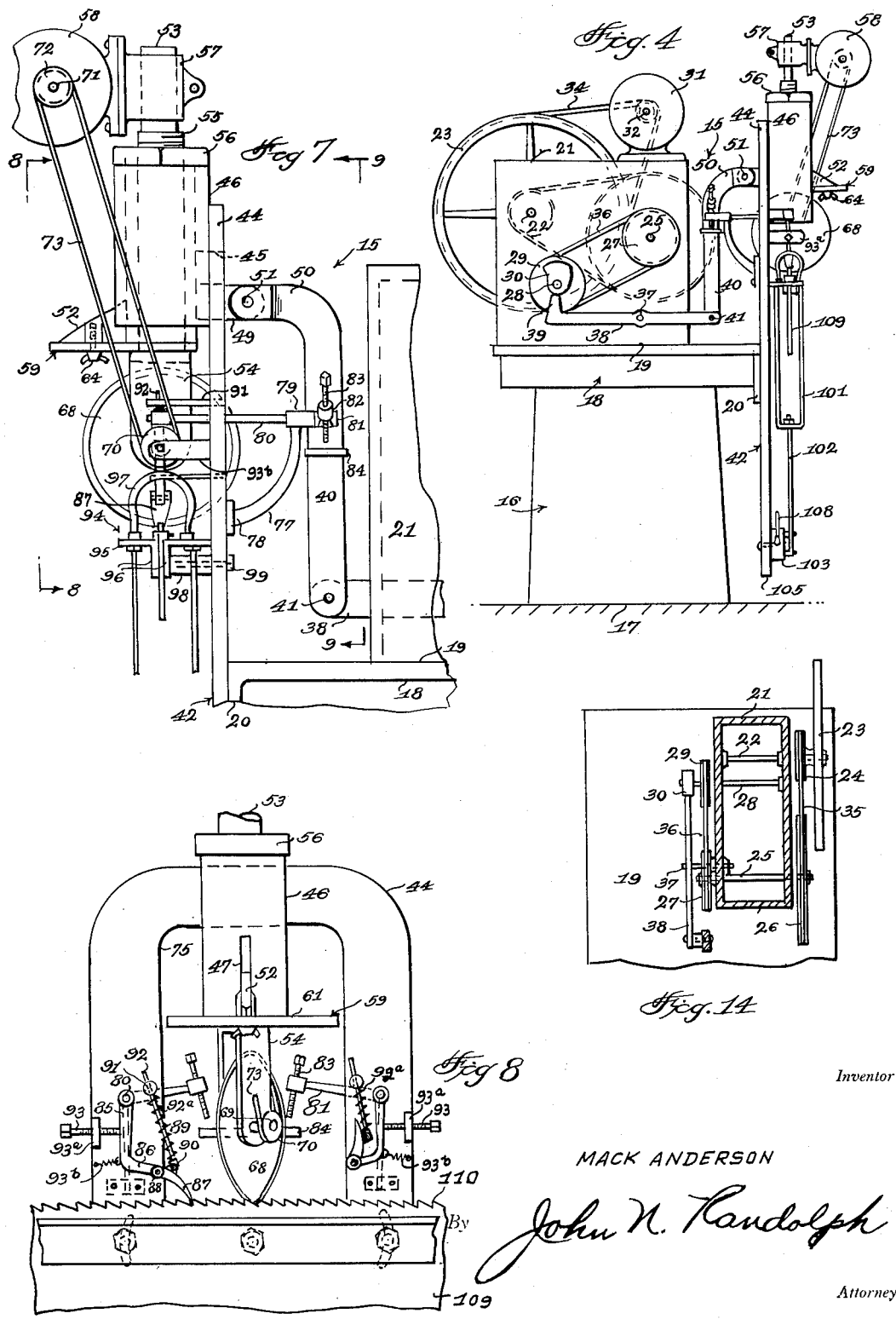

United States Patent Office 2,722,852
Patented Nov. 8, 1955

2,722,852

SAW SHARPENING MACHINE

Mack Anderson, Long Beach, Calif.

Application August 3, 1951, Serial No. 240,162

9 Claims. (Cl. 76—41)

This invention relates to a machine of novel construction for sharpening the teeth of saw blades particularly hand saws of either the one-man or two-man type and has for its primary object to provide a saw sharpening machine including a driven sharpening wheel and driven means for intermittently raising and lowering the sharpening wheel and for feeding the saw blade therebeneath in either of two directions while the sharpening wheel is elevated for successively and uniformly sharpening each tooth of the saw.

Another object of the invention is to provide a saw sharpener including an adjustable track along which the saw is fed beneath a sharpening wheel and which is capable of being bowed for sharpening the teeth of a crowned saw so that the crown will not be removed from the toothed edge of the saw by the sharpening operation.

Still a further object of the invention is to provide a saw sharpening machine having means for accurately adjusting the angle of the sharpening wheel for producing the proper angle or bevel on the teeth of the saw and means for angularly adjusting the track on which the saw is slidably supported relatively to the sharpening wheel for simultaneously accomplishing a desired pitch of the teeth as the beveled sharpening of the teeth is accomplished.

Still a further object of the invention is to provide a machine wherein the saw may be fed beneath the sharpening wheel in either direction for sharpening opposite sides of the teeth at a desired pitch and bevel.

A further object of the invention is to provide a saw sharpener of extremely simple construction which can be readily set manually and which will thereafter function to automatically and uniformly sharpen all the teeth of the saw on one side thereof.

Various other objects and advantages of the invention will hereinafter become more fully apparent from the following description of the drawings, illustrating a presently preferred embodiment thereof, and wherein:

Figure 1 is a front elevational view of the saw sharpening machine;

Figure 2 is a top plan view thereof;

Figure 3 is a side elevational view looking from right to left of Figures 1 and 2;

Figure 4 is a side elevational view looking from left to right of Figures 1 and 2;

Figure 5 is an enlarged fragmentary vertical sectional view taken substantially along a plane as indicated by the line 5—5 of Figure 1;

Figure 6 is a fragmentary horizontal sectional view taken substantially along a plane as indicated by the line 6—6 of Figure 5;

Figure 7 is an enlarged fragmentary side elevational view of a portion of the machine looking in the same direction as in Figure 3;

Figure 8 is a fragmentary front elevational view taken substantially along a plane as indicated by the line 8—8 of Figure 7;

Figure 9 is a fragmentary rear elevational view taken substantially along a plane as indicated by the line 9—9 of Figure 7;

Figure 10 is a fragmentary side elevational view of a portion of the machine;

Figure 11 is a horizontal sectional view taken substantially along a plane as indicated by the line 11—11 of Figure 10;

Figure 12 is a side elevational view of another part of the machine;

Figure 13 is a bottom plan view thereof taken substantially along a plane as indicated by the line 13—13 of Figure 12, and Figure 14 is a fragmentary horizontal sectional view taken substantially along a plane as indicated by the line 14—14 of Figure 3.

Referring more specifically to the drawings, the saw sharpening machine in its entirety is designated generally 15 and includes a supporting stand, designated generally 16 having a bottom surface 17 adapted to rest on a suitable supporting surface and a top portion 18 including a horizontally disposed top surface 19 and a depending flange 20 constituting a front wall of the top portion 18 and which is outwardly offset relatively to the portion of the base 16 disposed therebeneath, as best seen in Figures 3 and 4.

A housing 21 is supported on and suitably secured to the top surface 19 and has a shaft 22 journaled therein remote to the flange 20 which projects from one side of the housing 21. A large pulley 23 is fixed to the outer end of the shaft 22 and a smaller pulley 24 is fixed to the shaft 22, between the pulley 23 and the housing 21. A shaft 25 extends through and is journaled in the housing 21 adjacent its opposite end and is disposed parallel to the shaft 22 and has its ends projecting outwardly from each side of the housing 21. A pulley 26 is secured to one end of the shaft 25 and is disposed in alignment with the pulley 24 and is larger than said pulley 24 and smaller than the pulley 23. A pulley 27, which is smaller than the pulley 26, is fixed to the opposite end of the shaft 25. A shaft 28 is disposed transversely of the housing 21, near its rear end and below the level of the shaft 22 and has one end projecting from the side of the housing opposite to the side thereof from which the shaft 22 projects from said housing. A pulley 29 is fixed to said end of the shaft 28 in alignment with the pulley 27 and an eccentric cam 30 is fixed to the shaft 28 outwardly of the pulley 29.

As best illustrated in Figures 3 and 4, an electric motor 31 is mounted on and secured to the top of the housing 21 and has a small pulley 32 fixed to the armature shaft 33 thereof and which pulley 32 is connected to the large pulley 23 by a belt 34 for driving the shaft 22 at a greatly reduced speed relatively to the armature shaft 33. The pulleys 24 and 26 are connected by a belt 35 for driving the shaft 25 from the shaft 22 and at a considerably reduced speed. The pulleys 27 and 29 are connected by a belt 36 for driving the shaft 28 and revolving the cam 30 from the shaft 25. A pin 37 is fixed to the housing 21 and projects from the same side thereof as the shaft 28 and is disposed near the forward end of said housing and below the shaft 25. A rocker arm or beam 38 is pivotally mounted on the pin 37 at a point spaced from its forward and rear ends and said beam 38 has an upturned extension 39 at its rear end disposed beneath and bearing against the periphery of the cam 30. The lower end of a link 40, hereinafter to be described, is pivoted at 41 to the forward end of the beam 38.

An elongated frame 42 is disposed in a vertical plane and in an upright position and is secured intermediate of its upper and lower ends by fastenings 43 to the forward side of the flange 20. The frame 42 is provided with a laterally enlarged upper end portion 44 which extends upwardly from the surface 19 and which is provided with a vertically elongated opening 45.

A sleeve 46 is secured to the upper part of the frame portion 44 in a vertical position and is provided with diametrically aligned longitudinally extending slots 47 which open outwardly of its lower end and which register with a portion of the openings 45. An inner sleeve 48 is slidably mounted in the outer sleeve 46 and is provided adjacent its lower end with a radially projecting apertured lug 49 which extends outwardly through and is slidably mounted in the rear slot 47 and which also extends rearwardly through the opening 45. The link 40 is provided with a forwardly turned upper end portion 50 which is pivotally connected to the lug 49, rearwardly of the frame portion 44 by a horizontally disposed pivot pin 51. A flange or blade 52 extends radially from the bottom portion of the inner sleeve 48 through the front slot 47 and is slidably mounted in said front slot and is disposed with its opposite sides in vertical plane. A kingbolt 53 is rotatably and non-slidably disposed in the inner sleeve 48 and has a wheel fork 54 secured to and depending from its lower end and is provided near its upper end with a threaded portion 55 on which is threadedly mounted a nut 56. The nut 56 bears against the upper end of the sleeve 46 when the kingbolt 53 and sleeve 48 are in their lowermost positions, as illustrated in Figure 5. Accordingly, it will be apparent that by adjusting the nut 56 on the threaded portion 55 the extent that parts 48 and 53 may move downwardly relatively to the outer sleeve 46 may be varied. A bracket 57 is detachably fastened to the upper end of the kingbolt 53 above its threaded portion 55 and the nut 56 and provides a support for a second electric motor 58 which is secured to the bracket 57 and supported thereby for movement in unison with the kingbolt 53.

A plate 59 is keyed as seen at 60 in Figure 5 to the lower end of the kingbolt 53 and is supported by the fork 54, which bears against the underside of a portion of said plate, against the lower end of the inner sleeve 48. The plate 59 has a forwardly extending segment-shaped portion forming a protractor 61 the upper surface of which is inscribed with degree graduations, as seen at 62 in Figure 6. The protractor 61 is provided with an arcuate slot 63 which is disposed concentric to its outer edge and to the graduations 62. A thumbscrew 64, as seen in Figure 5, extends upwardly through the slot 63 and into a downwardly opening threaded recess 65 which is formed in the flange or blade 52. By tightening the thrumbscrew 64, the protractor plate 61 can be secured against the flat horizontally disposed bottom surface 66 of the blade 52 to position the fork 54 at any desired angle relatively to the plane of the frame 42. As seen in Figure 6, the bevelled outer end of the blade 52 constitutes an arrowhead or pointer 67 which functions with the graduations 62 for indicating the angular setting of the fork 54. A sharpening wheel or disk 68 is rotatably mounted in the fork 54 on an axle 69 which is fixed to said wheel and journalled in the fork and which has a pulley 70 fixed to one end thereof and disposed outwardly of the fork. Accordingly, it will be seen that the setting of the protractor plate 61 relatively to the pointer 67 likewise accomplishes the angular setting of the sharpening wheel 68 relatively to the plane of the frame 42, for a purpose which will hereinafter become apparent. The electric motor 58 is provided with a belt pulley 71 which is fixed to its armature shaft 72 and connected by an endless belt 73 to the pulley 70 for driving the sharpening wheel or disk 68.

As seen in Figure 10, the kingbolt 53 is provided with a key 74 which engages a circumferentially extending keyway 75 in the bore of the sleeve 48 and which is movable into and out of engagement with said keyway through a longitudinally extending slot 76 which opens outwardly of the lower end of the sleeve 48, as best seen in Figures 12 and 13. Said key and keyway provide the means for rotatably and non-slidably supporting the kingbolt 53 and the parts supported thereby relatively to the inner sleeve 48 while permitting said parts to be turned relatively to the sleeve 48 and sleeve 46 and secured in various adjusted positions by the setscrew 64 for angularly adjusting the plane of the sharpening wheel 68 relatively to the plane of the frame 42. Likewise, the kingbolt 53 and parts supported thereby are slidably movable relatively to the outer sleeve 46 with the inner sleeve 48 and the extent of their downward movement is limited by adjusting the nut 56 on the bolt portion 55 so that the nut forms an adjustable stop for engagement with the upper end of the outer sleeve 46 to limit the extent that the sharpening wheel 68 can be displaced downwardly.

Referring to Figures 5, 6 and 7, a bracket 77 is secured by fastenings 78 to the frame portion 44 on each side of the opening 45 and adjacent the lower end of said opening, said brackets being secured to the rear side of the frame portions 44 and extending upwardly and rearwardly therefrom and terminating in horizontally disposed bearings 79 each of which journals a portion of a shaft 80 which extends forwardly from its bearing 79 through a part of the frame portion 44 and in which said shaft is also journalled. As best seen in Figures 6 and 9, a lever 81 is secured to the rear end of each shaft 80, rearwardly of its bearing 79 and extends inwardly therefrom toward the other shaft 80. The levers 81 are provided with bosses 82 at their inner ends having internally threaded bores. A screw 83 is threaded downwardly through each boss 82 and is adjustable relatively thereto and the lower ends of the screws 83 are disposed above rigid plates or wings 84 which are fixed to and extend laterally from the link 40, so that when the link is displaced upwardly the plates 84 will strike the screws 83 to swing the levers 81 upwardly for turning the shafts 80 in opposite directions.

As best seen in Figure 8, an L-shaped lever 85 is secured to the forward end of each shaft 80, forwardly of the frame portion 44 and said levers 85 extend downwardly from the shafts 80 and have inwardly and downwardly extending free end portions 86. A pawl 87 is pivotally mounted as seen at 88 on the terminal of each lever portion 86 and normally extends downwardly and inwardly therefrom. A rod 89 is pivotally connected at 90 to the upper edge of each pawl 87 and extends upwardly and outwardly therefrom slidably through a spring stop 91 which is swivelly supported on a pin 92 which is secured to and extends forwardly from the frame portion 44. An expansion spring 92a is mounted on each rod 89 between its pivot 90 and the stop 91 to normally urge the free end of the pawl 87, with which the spring is associated, downwardly.

A setscrew forming an adjustable stop 93 extends threadedly through a boss 93a which is secured to the forward side of the frame portion 44 and the inner end of each stop 93 is disposed to be engaged by one of the levers 85 to limit the swinging movement of said lever outwardly. A tension spring 93b is connected to each lever 85 and anchored to the frame portion 44 for urging the levers 85 to swing outwardly of one another to thereby urge the levers 81 to be swung downwardly. As best illustrated in Figure 8, the pawls 87 may be swung upwardly and outwardly on their pivots 88 to inoperative positions as illustrated by the right-hand pawl of Figure 8 and in so moving, the rods 89 are swung past vertical positions and accordingly if either pawl 87 is in an inoperative position its spring 92a will retain its said position, since only one of the pawls 87 is utilized at any particular time, as will hereinafter become apparent.

A saw blade supporting track, designated generally 94 includes two rail members each of angular cross section, as best seen in Figures 5 and 7 and each of which includes a substantially horizontal flange 95 and a vertical flange 96. The horizontal flanges 95 are disposed in substantially the same plane and the vertical flanges 96 are disposed in spaced substantially parallel relationship. The rails 94 are connected by a plurality of yoke members 97, the terminals of each of which are suitably secured to the two rail flanges 95. The track 94 extends transversely across the frame portion 44 adjacent the lower edge of its opening 45 and on the outer side thereof and the flange 96 on the rail 94 disposed nearest the frame is provided with inwardly extending threaded bosses 98 each of which receives a clamping screw 99. The track 94 is provided with three bosses 98 and screws 99. As best seen in Figure 9, the intermediate screw 99 extends through an opening, not shown, in the frame portion 44 and the two outer screws 99 extend through arcuate slots 100 in the frame portion 44 so that by loosening the screws 99, for a purpose which will hereinafter become apparent, the track 94 may be inclined in either direction longitudinally thereof and secured in its inclined position by tightening the screws 99. As best seen in Figures 1, 3 and 4, a U-shaped member 101 is secured to the underside of the flange 95 adjacent each end of the track 94 and said U-shaped members 101 extend downwardly and inwardly and have adjacently disposed intermediate portions to which an end of a rod 102 is secured. The rods 102 form extensions of the members 101 and extend downwardly and inwardly relatively to one another and are each pivotally connected to diametrically spaced portions of a disk 103 which is journalled intermediate of said rod ends on a shaft 104 which projects from the lower portion 105 of the frame 42. The disk 103 is disposed on the outer side of the frame part 105 and has an extension forming a pointer 106 which is movable over a protractor portion 107 inscribed on the outer surface of the frame part 105. A handle or lever 108 is fixed to and projects outwardly from a portion of the periphery of the disk 103 for turning said disk in either direction and said disk has a sufficiently tight fitting engagement on the shaft 104 to retain any position to which it is moved. Accordingly, it will be apparent that when the handle 108 is swung in one direction for example clockwise, as seen in Figure 1 a pull will be exerted on the members 101, 102 for pulling the ends of the track 94 downwardly for bowing said track from end-to-end thereof or by swinging the handle 108 and disk 103 counterclockwise, a thrust will be exerted against the ends of the track through the members 101, 102 for returning and retaining the track 94 in a straight position.

A saw blade 109 from which the handles or handle, not shown, have been removed, is slidably supported on the track 94 for movement longitudinally thereof and with its toothed edge 110 disposed in an uppermost position above the level of the flanges 95. The saw blade 109 is slidably disposed between the flanges 96 and a block 111 is detachably secured to each end of the saw blade adjacent its toothed edge by a setscrew 112 and said blocks 111 ride upon the upper surfaces of the flanges 95 for supporting the blade slidably on the track 94, as illustrated in Figures 1 to 8.

For sharpening the saw teeth 110, assuming that it is first desired to sharpen the sides of the teeth 110 located adjacent the frame 42 to a desired angle of cross bevel, the sharpening wheel 68 is adjusted to this desired angle by loosening the setscrew 64 and turning the kingbolt 53 until the desired angle is indicated by the pointer 67 on the protractor 62, after which the setscrew 64 is tightened for clamping the sharpening wheel 68 at this desired angle. With the link 40 in a lowermost position as illustrated in Figure 7, the nut 56 is then adjusted until the bottom portion of the periphery of the sharpening wheel 68 will engage the teeth 110 to a desired depth. The screw 83 in the left-hand stop 93, as seen in Figure 8, is then adjusted to permit the left-hand lever 85 to swing a distance to permit its pawl 87 to travel a distance equal to the length of one of the teeth 110. With the blocks 111 secured to the saw blade 109, said saw blade is then positioned on the track 94 and at the left-hand end thereof as seen in Figure 1 so that the sharpening wheel 68 will be disposed to engage a tooth 110 disposed adjacent the right-hand end of the saw. The shafts and pulleys associated with the housing 21 are then turned to actuate the rocker arm 38 for elevating the link 40 and the parts connected thereto and associated therewith including the inner sleeve 48, kingbolt 53 and sharpening wheel 68. The right-hand pawl 87 as seen in Figures 1 and 8 is left in its inoperative position of these figures while the other left-hand pawl 87 is swung downwardly to its operative position of Figures 1 and 8. The motors 31 and 58 are then energized so that the sharpening wheel 68 will be driven by the motor 58 and the shafts and pulleys, associated with the housing 21 will be driven by the motor 31. As these shafts and pulleys revolve, the shaft 28 will turn slowly in a clockwise direction as seen in Figure 4 and cause the eccentric cam 30 to revolve therewith and as the beam extension 39 moves into engagement with a peripheral portion of said cam which is disposed adjacent the shaft 28 the rocker beam 38 will swing clockwise on its pivot 37 in response to the weight exerted downwardly on its forward end by the link 40 so that the sharpening wheel 68 will move downwardly to the limit afforded by the stop nut 56 when it contacts the upper end of the sleeve 46, and into a position in engagement with a tooth 110 disposed beneath the sharpening wheel for sharpening said tooth on the side thereof disposed nearest the frame 42 to a desired cross bevel. As the shaft 28 continues to turn clockwise as seen in Figure 4 the cam 30 will exert a downward thrust on the beam portion 39 to rock said beam counterclockwise on its pivot 37 for elevating the sharpening wheel 68 after a predetermined period of sharpening. As the link 40 is thus displaced upwardly its plates 84 will strike the screws 83 or at least the left-hand screw 83 as seen in Figure 8 to cause the lever 85 and pawl 87 associated with the lever 81 of said screw 83 to swing from left to right of Figure 8 and so that the pawl 87 will cause the blade 109 to slide on the track 94 from left to right a distance equal to the length of one tooth 110. As the rocking beam 38 is thereafter swung in the opposite direction and the link 40, sleeve 48, kingbolt 53 and wheel 68 again move downwardly, the sharpening wheel 68 will engage and similarly sharpen the next tooth which has been moved to a position thereunder. At the same time, the left-hand plate 84, as seen in Figure 8, will move downwardly away from the left-hand screw 83 thereby permitting the left-hand spring 93b to swing the left-hand lever 85 and pawl 87 from right to left relatively to the teeth 110 and into a position to engage the next left-hand tooth 110 to the one previously engaged thereby. It will be apparent that this operation can be repeated throughout substantially the length of the saw 109 and the saw teeth at the extreme ends of the saw may be sharpened by positioning the blocks 111 at points spaced from said end teeth and by manually moving the end teeth into position beneath the sharpening wheel 68. For bevelling the opposite sides of the teeth 110, the saw is turned so that the other side thereof is adjacent the frame 42 and the right-hand rather than the left-hand lever 85 and pawl 87, as seen in Figure 8, are then employed for moving the saw 109 from right to left as seen in Figures 1 and 8, subsequent to re-setting of the angle of the sharpening wheel 68 for sharpening the opposite sides of the teeth 110 to a desired bevel.

Teeth of saw blades have different pitches and in order to maintain the proper pitch when the saw teeth are sharpened, the screws 99 may be loosened, as previously described, for tilting the track 94 so that the plane of the cutting edge or toothed edge 110 may be disposed at different angles relatively to the axis of the kingbolt 53 and vertical axis of the sharpening wheel 68 so that a proper desired pitch can be maintained when the saw teeth are sharpened. Likewise, for sharpening crown saws having a convexly arced toothed edge 110, the disk 103 is turned clockwise as seen in Figure 1 so that the upper surface of the track 94 is convexly bowed. The sharpening wheel 68 is then initially set relatively to a tooth disposed intermediate the ends of the saw for sharpening to a desired depth and bevel after which the saw is positioned adjacent one end of the rack 94 and the sharpening operation is accomplished as previously described. As one of the blocks 111 travels away from the sharpening wheel 68 it will move down an incline toward one end of the track 94 while the other block 111 will move up an incline of the other end of the track 94 toward the sharpening wheel 68 so that the crown toothed edge of the blade will be maintained since the track 94 may be crowned to correspond to the crown of the toothed edge 110. The desired crown of the toothed edge may be accurately set by means of the pointer 106 of the protractor scale 107 and to insure proper crowning of the track 94 from end-to-end thereof the two outermost screws 99 may be loosened while the disk 103 is adjusted and thereafter tightened to assist in maintaining the track 94 at a desired arc.

It will be readily apparent that the motors 31 and 58 operate independently so that the sharpening wheel 68 can be driven at a uniform speed at all times by the motor 58 independent of the operation of the motor 31 for effecting the raising and lowering of the sharpening wheel and the feeding of the saw therebeneath. It will also be apparent that the motor 58 will be displaced upwardly and downwardly in unison with the sharpening wheel so that the proper tension will be maintained on the belt 73 at all times.

Various modifications and changes are contemplated and may obviously be resorted to, without departing from the spirit or scope of the invention as hereinafter defined by the appended claims.

I claim as my invention:

1. A saw sharpener comprising a base, a housing mounted on and secured to the base, a shaft journalled in said housing, an eccentric cam fixed to the shaft, a rocker beam pivotally supported on the housing intermediate of its ends having one end disposed in engagement with said cam and actuated thereby when the camshaft is revolved for oscillating the rocker beam, a first motor mounted on said housing, speed reduction means connecting said first motor to the camshaft for revolving the cam at a reduced speed, an upright frame secured to the base, an upright guide sleeve secured to an outer side of said frame, an inner sleeve slidably and nonrotatably mounted in the guide sleeve, a link connecting said inner sleeve to the opposite end of the rocker beam for elevating the inner sleeve in the guide sleeve when the first mentioned end of the rocker beam is displaced downwardly by the cam, a kingbolt rotatably and non-slidably engaging in said inner sleeve for sliding movement therewith relatively to the guide sleeve, a fork depending from the lower end of the kingbolt, a sharpening wheel journalled in said fork, a second motor supported by the kingbolt and connected to and driving the sharpening wheel, a saw supporting track, secured to the outer side of said frame below the sharpening wheel, having a slot extending from end-to-end thereof for slidably engaging a saw blade, means detachably secured to the toothed edge of the saw blade and slidably engaging the upper surface of the track for supporting the toothed edge of the blade above the track, a pawl engaging the teeth of the saw, a lever swingably supported on the forward side of the frame to which said pawl is pivotally connected, means for swinging the pawl and lever in one direction when the link is elevated to raise the sharpening wheel for sliding the saw in one direction along the track, and spring means for moving the pawl and lever in the opposite direction when the link is displaced downwardly for causing the pawl to ride over a tooth of the saw and into engagement with another tooth thereof preparatory to advancing the saw another tooth's length in the same direction when the link and sharpening wheel are again displaced upwardly.

2. A saw sharpener as in claim 1, and means including a protractor for clamping the kingbolt to the inner sleeve for positioning the plane of the sharpening wheel at different angles relatively to the plane of the frame for sharpening the saw teeth to different angles of cross bevel.

3. A saw sharpener as in claim 1, and a stop adjustably mounted on the kingbolt and engaging the upper end of the guide sleeve for adjustably limiting the downward movement of the sharpening wheel.

4. A saw sharpener as in claim 1, said means for swinging the pawl and lever including an adjustable element for varying the extent of travel of the lever and pawl when the link is displaced upwardly for varying the distance that the saw is moved along the track.

5. A saw sharpener as in claim 4, and an adjustable stop supported by the frame to engage the pawl supporting lever to limit the travel of the pawl relatively to the saw.

6. A saw sharpener as in claim 1, and an expansion spring urging the pawl downwardly into engagement with a saw tooth, said pawl being swingable upwardly relatively to the lever to an inoperative position, and said expansion spring being movable across an upright position by movement of the pawl to an inoperative position whereby the expansion spring will yieldably retain the pawl in its inoperative position.

7. The combination with a driven saw sharpening wheel having a driven means for intermittently elevating the sharpening wheel and for simultaneously feeding the toothed edge of a saw therebeneath for successively sharpening the teeth of the saw, of a frame supported in an upright position, a track secured to said frame transversely thereof and comprising transversely spaced elongated angle members having coplanar horizontal upper flanges and vertical flanges depending from adjacent edges of said upper flanges, said vertical flanges being spaced apart to define a slot of a width only slightly greater than the thickness of the saw blade for slidably receiving the saw blade and in which the saw blade is slidably movable beneath the sharpening wheel when actuated by said intermittent feed means, and blade supporting blocks having slots to receive end portions of the saw blade, fastenings carried by the blocks for detachably securing the blocks to the saw blade adjacent its toothed edge, said blocks slidably engaging on the upper flanges of the track for supporting the toothed edge of the saw above the track and in a position to be engaged by the sharpening wheel.

8. In a saw sharpening machine as in claim 7, means pivotally mounting said track intermediate of its ends on the frame for vertical oscillating movement, and clamping means adjustably clamping the track to the frame for positioning the longitudinal axis of the track at different inclines relatively to a horizontal plane whereby the toothed edge of the saw will be disposed at an incline corresponding to the incline of the track so that the saw teeth will be sharpened to a desired pitch by the sharpening wheel.

9. In a saw sharpening machine as in claim 7, means securing the track to the frame intermediate of the ends of the track, lever means swingably connected to the frame beneath the track, and links connected to the lever means and to end portions of the track for exerting a downward pull on the end portions of the track when the lever means is turned in one direction for convexly arcing the upper surface of the track for maintaining the crown in the toothed edge of the saw as the saw teeth are successively sharpened by the sharpening wheel as the saw is fed along said track.

(References on following page)

References Cited in the file of this patent

UNITED STATES PATENTS

| Number | Name | Date |
|---|---|---|
| 324,434 | Totman | Aug. 18, 1885 |
| 928,332 | Robinson | July 20, 1909 |
| 1,480,172 | Majewicz | Jan. 8, 1924 |
| 1,674,853 | Collier | June 26, 1928 |
| 1,779,969 | Gillmann | Oct. 28, 1930 |
| 1,970,864 | Nosan | Aug. 21, 1934 |
| 2,110,396 | Hamilton | Mar. 8, 1938 |
| 2,155,809 | Thurston | Apr. 25, 1939 |
| 2,287,265 | Oltmanns | June 23, 1942 |
| 2,329,879 | Christy et al. | Sept. 21, 1943 |
| 2,343,171 | Collier | Feb. 29, 1944 |
| 2,407,821 | Engle | Sept. 17, 1946 |
| 2,429,300 | Wilbert | Oct. 21, 1947 |
| 2,470,290 | Chryst | May 17, 1949 |
| 2,517,873 | Harrell | Aug. 8, 1950 |
| 2,535,439 | McEwan | Dec. 26, 1950 |
| 2,547,553 | Battocchi | Apr. 3, 1951 |
| 2,580,778 | Hexter et al. | Jan. 1, 1952 |
| 2,608,110 | Clark | Aug. 26, 1952 |
| 2,615,354 | Higgins | Oct. 28, 1952 |